United States Patent [19]
Murayama et al.

[11] 3,793,715
[45] Feb. 26, 1974

[54] PROCESS FOR PRODUCING HIGH-QUALITY ELECTRETS
[75] Inventors: Naohiro Murayama; Makoto Fukuda, both of Iwaki, Japan
[73] Assignee: Kureha Kagaku Kogyo Kabushiki Kaisha, Chuo-ku, Tokyo-to, Japan
[22] Filed: Aug. 26, 1971
[21] Appl. No.: 175,307

[30] Foreign Application Priority Data
Aug. 26, 1970  Japan.............................. 45/74291

[52] U.S. Cl............. 29/592, 307/88 ET, 179/111 E
[51] Int. Cl....................... H04r 31/00, H04r 17/00
[58] Field of Search....... 29/592 E, 592; 307/88 ET; 179/111 E, 100.41 B; 317/262

[56] References Cited
UNITED STATES PATENTS
2,986,524  5/1961  Padgett ........................... 179/111 E
3,316,620  5/1967  Stewart........................... 29/155.5

OTHER PUBLICATIONS
Harry Diamond Labs, Electrets Part II A Bibliography, 9/30/1962, Washington, D.C., Page 48, Lines 34–52.

Gutmann, F., The Electret, From Reviews of Modern Physics, Volume 20, No. 3, July, 1948, Page 457, Col. 1, Lines 4–21, Page 457–458, Col. 2 and 3, Lines 19–48, Table I.

Good and Stranathan, Improved Method of Making Permanent Electrets and Factors Which Affect Their Behavior, From Physical Review, Vol. 56, Oct.–Dec., 1939, Page 811.

Primary Examiner—Charles W. Lanham
Assistant Examiner—D. C. Crane
Attorney, Agent, or Firm—Sughrue, Rothwell, Mion, Zinn & Macpeak

[57]  ABSTRACT

A process for producing a high quality electret comprising treating an electret having a heterocharge and a homocharge prepared from a molded resin in the presence of water to decay the unstable component of the heterocharge and the homocharge and maintain only a stable heterocharge.

4 Claims, 1 Drawing Figure

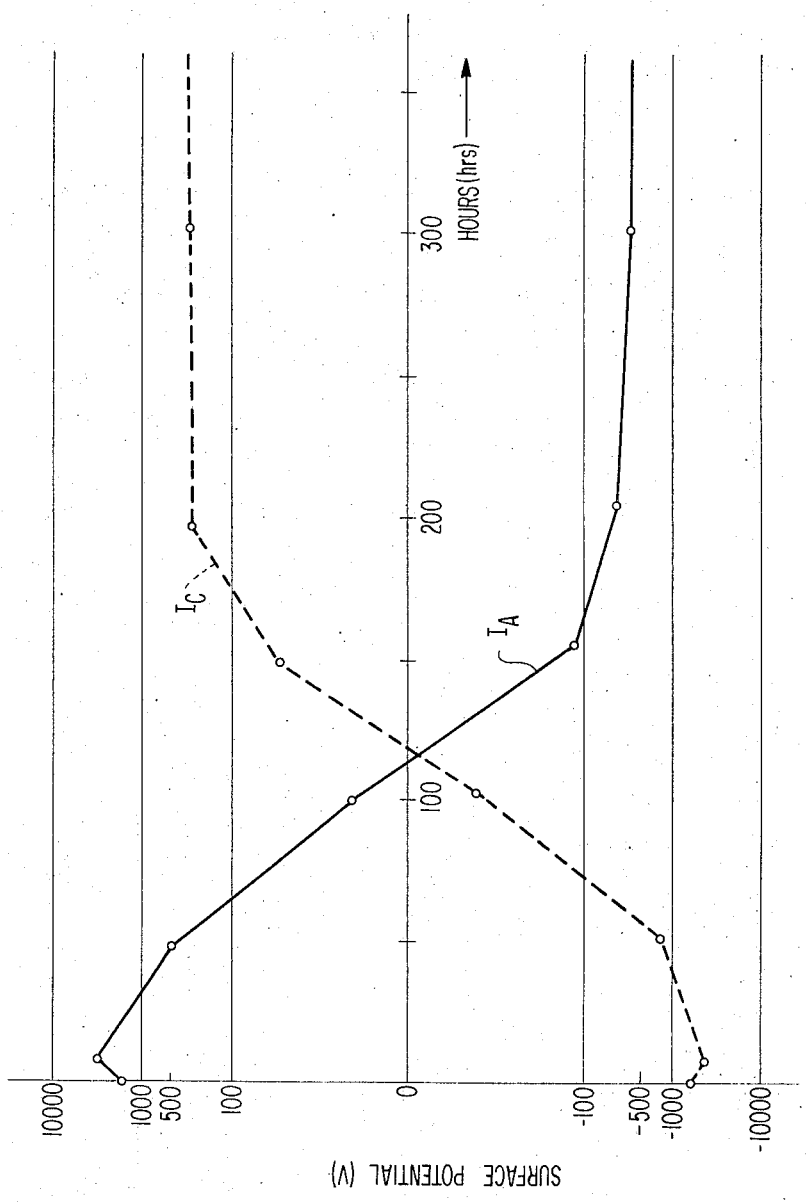

3,793,715

PROCESS FOR PRODUCING HIGH-QUALITY ELECTRETS

BACKGROUND OF THE INVENTION

1. Field of the Invention

The present invention relates to a process for producing a stable electret having excellent qualities made of a resin molding.

2. Description of the Prior Art

In general, an electret is prepared by maintaining a film, sheet, or other shaped article of a plastic composed of a low molecular weight organic material such as carnauba wax or naphthalene; a polar resin such as a polyfluorovinylidene resin, a polyvinyl chloride resin, polycarbonate, polyester, an acrylic resin, etc.; a non-polar resin such as polyethylene, Teflon, polypropylene, polystyrene, etc., or copolymers of them; or a mixture of these materials at a suitable temperature for a long period of time under the application of a hinged d.c. potential and cooling the article to room temperature while maintaining the d.c. potential. Because such an electret can maintain its polarized state for a long period of time as well as having an excellent workability, toughness, and flexibility, the electret is believed to be widely used as static type electro-sonic transformer such as speaker and microphone and also in other specific fields.

Among the aforesaid materials for producing electrets, a polar high molecular weight material such as polymethacrylate, polyethylene terephthalate, polycarbonate, polar fluorocarbon resins, chlorine-containing resins, etc. is well known as a material for forming the electret having a comparatively longer life.

However, the electret prepared from such material can not always be utilized under such severe conditions as in hot water and an electrolyte solution.

The inventors have discovered a process of producing an electret which can maintain its function semi-permanently even under severe conditions.

For producing an electret from the aforesaid polar high molecular weight material, a process has hitherto been employed in which the material is placed in a high d.c. electric field of about 1 KV–300 KV/cm at a proper temperature from a glass transition point (T$g$) of the material to a melting point (T$m$) thereof, the material is maintained under the conditions for a proper period of time to cause the polarization thereof, and it is cooled under the electric field to room temperature to fix the polarization, when the electric field is removed. In this case, a homo-charge having the same polarity as that of the electrode contacted to the electret and a heterocharge having the opposite polarity to that of the electrode are formed simultaneously but one of these charges predominates according to the conditions for producing the electret, which gives the polarity of the charge observed throughout the whole electret.

In general, an electret shows a heterocharge or a comparatively low homocharge directly after the production thereof but the heterocharge is decayed in a short period of time and then the electret shows only a large homocharge. Also, when the electret directly after the polarization treatment is maintained at a temperature higher than room temperature, the time required for converting the electret from a heterocharge to a homocharge is remarkably reduced and the state of high homocharge can be obtained in a short period of time.

As mentioned above, the heterocharge in an electret is generally unstable and the comparatively stable homocharge is desirable as a charge of electret. An electret using such stabilized homocharge has been practically used for microphone and speaker at room temperature. However, such homocharge becomes unstable at a high temperature or in water, that is, the charges on the opposite sides of the electret decay quickly under such severe conditions, which makes such electret unstable under such conditions.

The inventors have discovered a process of providing a highly stable heterocharge after by positively removing the homocharge stable at room temperature.

SUMMARY OF THE INVENTION

When the electret produced by an ordinary method is treated under the presence of water, e.g., treated by water, an electrolyte solution or steam, the polarity of the charge is first changed by the decay of the unstable heterocharge and the homocharge appears predominantly, and thereafter, the homocharge decays to remove the charge on the opposite sides of the electret. Astonishingly, however, when the electret is further treated under the same condition, the polarity of the charge changes again and a large heterocharge appears again. This is proof that a heterocharge more stable than the homocharge that has been hitherto considered to be stable is present, and the electret showing the heterocharge produced according to the above mentioned process can retain its charge for far longer periods of time than the electret showing a homocharge prepared by a conventional process. Also, when such an electret as showing the stable heterocharge is placed in water, salt water, or a Ringer's solution, the life of it becomes extremely longer than that of the electret showing the homocharge. In particular, the treatment of the electret in water is quite effective since the treatment does not give bad influences on the stable heterocharge remaining after the treatment, the shape of the electret treated is not deformed and almost no heating means is required owing to that any heating step is not employed in the water treatment.

In addition, the same can be achieved by only a heat treatment and the process by the heat treatment is described in detail in the specification of Japanese Patent Application No. 19,723/'70.

BRIEF DESCRIPTION OF THE DRAWING

The FIGURE shows the variation of the surface potential of the electret produced in Example 1 with the passage of time placed in water at 50°C.

DESCRIPTION OF THE PREFERRED EMBODIMENTS

The original electret used as a starting material in this invention may be prepared by any known methods. For example, when the electret is prepared by directly contacting the material for the electret with electrodes, an electret showing a heterocharge is first formed and then the electret is gradually converted into an electret showing a homocharge. On the other hand, when the electret is prepared by inserting a gas permeable material such as paper between the material for the electret and the electrode, the electret formed shows from the first a weak homocharge and the charge is gradually increased with the passage of time to provide the electret having stable homocharge at normal temperature.

In the process of this invention, not only the electret having such stabilized homocharge but also the electret having the heterocharge or the weak homocharge immediately after the preparation thereof can be used.

In case of treating the electret having the heterocharge first in water, the heterocharge is once changed into a homocharge and then the homocharge is changed again to a heterocharge to provide an electret having the stable heterocharge.

For preparing the electret any electric field lower than a breakdown voltage may be used but a higher potential is desirable and ordinarily a potential of 1 –300 KV./cm is used.

Also, the temperature for forming the electret depends upon the nature of the resin used as the material for the electret but is preferably between the glass transition point and the melting point of the resin. As the electrodes used for forming the electret, aluminum, copper and stainless steel are preferably used but an electrolyte solution and any other conductive materials may also be used.

The electret thus formed is treated in the presence of water or in water or an aqueous electrolyte solution in accordance with the process of this invention and the higher the treatment temperature is, the shorter the charge conversion period of time is. For example, when the electret is prepared by a material based on polyvinylidene fluoride, the unstable heterocharge and homocharge decay away and the electret showing the stable heterocharge is formed by treating it with water or an aqueous electrolyte solution for 30 hours at 90°C, 70 hours at 70°C, or 130 hours at 50°C.

Because the operation of obtaining the electret showing the stable heterocharge is simple, it is unnecessary to increase the temperature for the treatment too much and hence the shape of the material will not be deformed during the production of the stable electret. Furthermore, the process of this invention has an excellent feature that no specific or larger installation is necessary and is different from the process of employing the heat treatment. Also, because a high temperature treatment is not necessary in the process of this invention, the process of this invention does not give bad influences on the properties of the electret, for example, the dipoles in the electret are not relaxed during the treatment.

As the material for the electret in this invention are preferably used polar polymers and practical examples of them include polyvinylidene fluoride, polyvinyl chloride, acrylic resins, polyesters, and the like.

As mentioned above, by the process of this invention, the electret maintaining the charge stably for a longer period of time even under severe conditions can be produced and the economical values of such electret are quite large as compared with other conventional electrets. The heterocharge of the electret formed by the process of this invention may be one formed by ionic polarization or the polarization of dipoles.

The following examples are intended to illustrate the present invention but not to limit it in any way.

EXAMPLE 1

A sheet of about 1 mm in thickness prepared by extrusion-molding a mixture of 60 parts by weight of polyvinylidene fluoride and 40 parts by weight of methyl polymethacrylate was sandwiched by stainless steel electrodes at the opposite surfaces of it and they were maintained in an air bath for one hour at a constant temperature of 120° C while applying a d.c. electric field of 70 KV. (field strength of 70 KV./cm). Thereafter, while continuing the application of the d.c. electric field, the sheet was allowed to cool to room temperature for 1.5 hours.

When the surface potential of the electret thus prepared was measured by means of a rotary sector type potentiometer with an interval of 1 cm between the electrode and the electret, it was observed that the electret had a homocharge of about 1,800 volts. When the electret was placed in water at 50°C, the surface potential thereof became zero after about 130 hours. When the electret was further placed in water continuously for about 10 hours, the electret showed a stable heterocharge of about 200 volts. The decay of the charge of the electret having the stable heterocharge was measured when the electret was placed in air at 100°C or 80°C or in water at 50°C or room temperature and the results obtained are shown in Table 1. Also, the variation of the surface potential of the electret with the passage of time when it was placed in water at 50°C is shown in the graph of FIGURE 1 of the accompanying drawing, in which $1_c$ stands for the potential of the surface that had been brought into contact with the cathode and $1_A$ stands for the potential of the surface that had been brought into contact with the anode.

In the following table, the time constant $\tau$ (tau: the gradient of surface potential to the variation of time) of the decay of surface potential of the electret having the stable heterocharge prepared by the process of this invention in air at 100°C or 80°C or in water at 50°C or room temperature was compared with that of a conventional electret having a homocharge.

TABLE 1

| Preservation condition | Decay time of surface potential ($\tau$) | |
|---|---|---|
| | Homocharge | Heterocharge |
| 100°C | 100 hours | longer than 5000 hours |
| 80°C | 600 hours | longer than a year |
| 50°C in water | 50 hours | longer than a year |
| room temperature in water | 150 hours | longer than a year |

EXAMPLE 2

A copolymer of 80 parts of vinylidene fluoride and 20 parts of ethylenetetrafluoride was prepared. A mixture of 60 parts of the copolymer thus prepared and 40 parts of methyl polymethacrylate was kneaded by means of a hot rolling machine at about 150°C and then molded under pressure and under heating to a sheet of 0.5 mm in thickness. The sheet formed was sandwiched by stainless steel electrodes at both surfaces and placed in an air bath at a constant temperature of 100°C for one hour while apply a d.c. electric field of 3.5 KV. (field intensity 70 KV./cm.) Thereafter, the sheet was allowed to cool up to room temperature over a period of 1.5 hours while continuing the application of the electric field.

When the surface potential of the electret thus prepared was measured by means of a rotary sector type potentiometer with an interval of 1 cm. between the electrode and the sample, the electret was observed to have a homocharge of about 1,000 volts.

When the electret was placed in water at room temperature for 100 hours, the surface potential was converted into a heterocharge of about 200 volts.

The results of measuring the decay of the charge when the electret having the stable heterocharge was stored in air at 100°C or 80°C, or in water at room temperature are shown in Table 2. In the table, the time constant tau $\tau$ (tau: the gradient of surface potential to the variation of time) of the decay of the surface potential of the electret having the stable heterocharge prepared by the process of this invention in air at 100°C or 80°C or water at room temperature was compared with that of a conventional electret having a homocharge which has been believed to be stable.

TABLE 2

| Preservation condition | Decay time of surface potential ($\tau$) | |
|---|---|---|
| | Homocharge | Heterocharge |
| 100°C in air | 5 hours | longer than 500 hours |
| 80°C in air | 20 hours | longer than one year |
| water at room temperature | 10 hours | longer than one year |

EXAMPLE 3

An electret was prepared by the same procedure as in Example 1 using the sheet as used in Example 1. When the surface potential of the electret was measured by means of a rotary sector type potentiometer, it was observed that the electrode showed a homocharge of about 1,800 volts. When the electret was placed in a physiological salt solution at room temperature, the surface potential became zero after about 200 hours. When the electret was further placed continuously in the solution, the electret showed a heterocharge of about 200 volts after 10 hours. The decay of the heterocharge when the electret having the stable heterocharge was preserved in air at 100°C or 80°C or in a physiological salt solution at room temperature was measured, the results of which are shown in the following table.

In Table 3, the time constant $\tau$ of the decay of the surface potential about the stable heterocharge obtained by the process of this invention in air at 100°C or 80°C or in the physiological salt solution at room temperature was compared with that about a homocharge that had hitherto been believed to be stable.

TABLE 3

| Preservation condition | Decay time of surface potential ($\tau$) | |
|---|---|---|
| | Homocharge | Heterocharge |
| 100°C | 100 hours | longer than 5000 hours |
| 80°C | 600 hours | longer than a year |
| Room temp. in physiological salt solution | 120 hours | longer than a year |

EXAMPLE 4

An electret was prepared as in Example 1. When the surface potential of the electret prepared was measured by means of rotary sector type potentiometer with an interval of 1 cm between the electrode and the electret, it was observed that the electret showed a homocharge of about 1800 volts. When the electret was sterilized by heating in a medical steam sterilizer, the electret having a stable heterocharge of about 200 volts was formed.

The decay of the stable heterocharge when the electret was placed in air at 100°C or 80°C or in water at room temperature was measured, the results of which are shown in Table 4.

In Table 4, the time constant $\tau$ of the decay of the surface potential about the heterocharge obtained by the process of this invention in air at 100°C or 80°C or in water at room temperature (20°–25°C) was compared with that about a homocharge that had been believed to be stable.

TABLE 4

| Preservation condition | Decay time of surface potential ($\tau$) | |
|---|---|---|
| | Homocharge | Heterocharge |
| 100°C | 100 hours | longer than 5000 hours |
| 80°C | 600 hours | longer than a year |
| Room temp. in water | 150 hours | longer than a year |

What is claimed is:

1. A process for preparing an electret having a stable heterocharge, which comprises:
   treating an electret prepared from a molded polar resin by a conventional process and having an unstable heterocharge and a homocharge by contacting said electret with water to cause decay of the unstable heterocharge and homocharge, and
   subsequently contacting said treated electret with water to thereby establish a stable heterocharge thereafter.

2. The process of claim 1, wherein said water is in the form of an aqueous electrolyte solution.

3. The process of claim 1, wherein said water is in the form of steam.

4. The electret produced by the process of claim 1.

* * * * *